(12) United States Patent
Livshits et al.

(10) Patent No.: US 10,190,340 B2
(45) Date of Patent: Jan. 29, 2019

(54) SMART HANDCUFFS AS PART OF A PERSONAL-AREA NETWORK

(71) Applicant: MOTOROLA SOLUTIONS, INC, Chicago, IL (US)

(72) Inventors: Pavel Livshits, Modiyin (IL); Nissim Gean, Netanya (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/397,761

(22) Filed: Jan. 4, 2017

(65) Prior Publication Data

US 2018/0187455 A1 Jul. 5, 2018

(51) Int. Cl.
*E05B 75/00* (2006.01)
*H04W 56/00* (2009.01)
*H04L 12/24* (2006.01)
*H04W 4/80* (2018.01)
*E05B 47/00* (2006.01)

(52) U.S. Cl.
CPC .......... *E05B 75/00* (2013.01); *H04L 41/0681* (2013.01); *H04W 4/80* (2018.02); *H04W 56/002* (2013.01); *E05B 2047/0094* (2013.01)

(58) Field of Classification Search
CPC .......... E05B 75/00; E05B 2047/0094

USPC ........................................ 340/539.13; 455/73
See application file for complete search history.

(56) References Cited

U.S. PATENT DOCUMENTS

| | | | |
|---|---|---|---|
| 8,839,796 B2 * | 9/2014 | Reese ..................... | E05B 75/00 128/875 |
| 2010/0124881 A1 * | 5/2010 | Uppunda .............. | H04W 48/18 455/26.1 |
| 2016/0098581 A1 * | 4/2016 | Mart Ascencio ...... | G06Q 10/00 340/5.82 |

* cited by examiner

*Primary Examiner* — Qutbuddin Ghulamali (57) ABSTRACT

Smart handcuffs are provided herein as part of a personal-area-network (PAN) along with a method for operating the smart handcuffs and the PAN. During operation smart handcuffs will pair with a first PAN master device. An alarm will sound when no system identification (SSID) is detected by the handcuffs, when no SSID is detected by the handcuffs that matches SSIDs within an internal database, when the handcuffs have broken the pairing with the first PAN master device, and the handcuffs have not paired or are not pairing with a second PAN, or when the handcuffs have broken the pairing with the first PAN master device, and no update from the handcuffs has been received by the first master device that the handcuffs have paired or will pair with the second PAN.

8 Claims, 6 Drawing Sheets

SMART HANDCUFFS AS PART OF A PERSONAL-AREA NETWORK

FIELD OF THE INVENTION

The present invention generally relates to smart handcuffs, and more particularly to a method and apparatus for alarming when handcuffs are not paired with an appropriate public-safety personal-area network (PAN) or do not detect an appropriate PAN system ID.

BACKGROUND OF THE INVENTION

There are many instances of detained persons escaping from public-safety officers. Therefore, a need exists for a method and apparatus that will help prevent detained persons from escaping public-safety officers.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, smart handcuffs are provided herein as part of a personal-area-network (PAN) along with a method for operating the smart handcuffs and the PAN. During operation smart handcuffs will pair with a first PAN master device. An alarm will sound when:

no system identification (SSID) is detected by the handcuffs;

no SSID is detected by the handcuffs that matches SSIDs within an internal database;

when the handcuffs have broken the pairing with the first PAN master device, and the handcuffs have not paired or are not pairing with a second PAN; or when the handcuffs have broken the pairing with the first PAN master device, and no update from the handcuffs has been received by the first master device that the handcuffs have paired or will pair with the second PAN.

Figure 1:
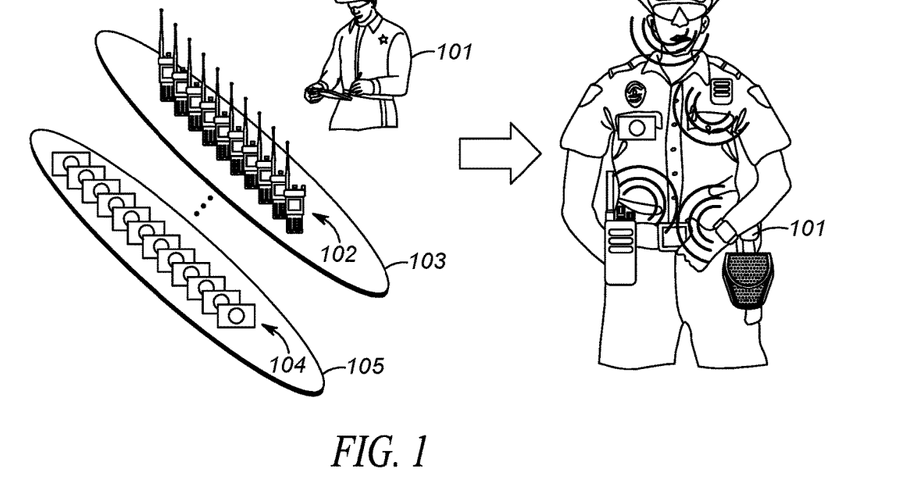
FIG. 1 illustrates an operational environment for the present invention.

Turning now to the drawings, wherein like numerals designate like components, FIG. 1 illustrates an operational environment for the present invention. During operation next-generation public safety officers 101 will be equipped with devices that determine various physical and environmental conditions surrounding the public-safety officer. These conditions are generally reported back to a dispatch operator so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer of the future will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, . . . , etc. All devices pulled by the officer will be configured to form a PAN by associating (pairing) with each other and communicating wirelessly among the devices.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

Thus, pairing and unpairing typically involves some level of user interaction. This user interaction is the basis for confirming the identity of devices. Once pairing successfully completes, a bond will have been formed between the two devices, enabling those two devices to connect to each other in the future without again requiring the pairing process. When desired, the bonding relationship can later be removed by the user. Because devices are pulled randomly at the beginning of a shift, an officer may pull a different array of devices every time they form a PAN. This requires that old bonds be cleared from every device at the end of a shift, and new be formed every time the officer pulls devices at the beginning of their shift.

As shown in FIG. 1, public-safety officer 101 has an array of devices 102 and 104 to use during the officer's shift. For example, the officer may pull one radio 102 and one camera 104 for use during their shift. Other devices may be pulled as well. As shown, devices 102 and 104 may be located on a charger 103/105.

As shown in FIG. 1, officer 101 will preferably wear the devices during a shift by attaching the devices to worn clothing. These devices will form a PAN throughout the officer's shift.

Figure 2:
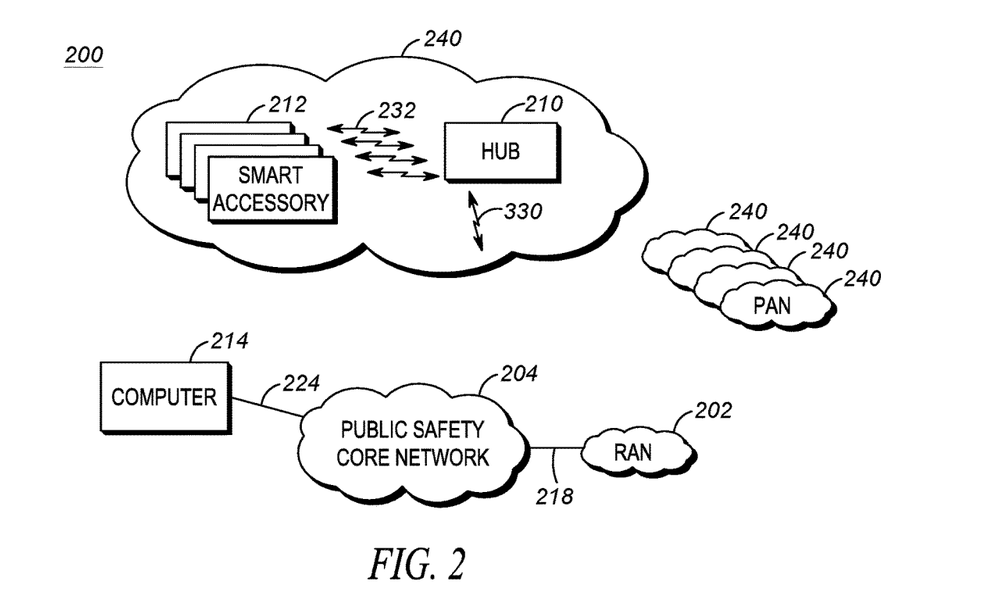
FIG. 2 depicts an example communication system.

FIG. 2 depicts an example communication system 200 that incorporates PANs created as described above. System 200 includes one or more radio access networks (RANs) 202, a public-safety core network 204, hub (PAN master device) 210, local devices (slave devices that serve as smart accessories) 212, a computer 214, and communication links 218, 224, and 232. In a preferred embodiment of the present invention, hub 210 and devices 212 form PAN 240, with communication links 232 between devices 212 and hub 210 taking place utilizing a short-range communication system protocol such as a Bluetooth communication system protocol. Each officer will have an associated PAN 240.

RAN 202 includes typical RAN elements such as base stations, base station controllers (BSCs), routers, switches, and the like, arranged, connected, and programmed to provide wireless service to user equipment (e.g., hub 210, and the like) in a manner known to those of skill in the relevant art.

The public-safety core network 204 may include one or more packet-switched networks and/or one or more circuit-switched networks, and in general provides one or more public-safety agencies with any necessary computing and communication needs, transmitting any necessary public-safety-related data and communications.

Hub 210 serves as a PAN master device, and may be any suitable computing and communication devices configured to engage in wireless communication with the RAN 202 over the air interface as is known to those in the relevant art. Moreover, one or more hub 210 are further configured to engage in wired and/or wireless communication with one or more local device 212 via the communication link 232. Hub 210 will be configured to determine when to forward information via RANs 202 based on a combination of device 212 inputs.

Devices 212 and hub 210 may comprise any device capable of forming a PAN. For example, devices 212 may comprise a gun-draw sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a barometer, speech recognition circuitry, a gunshot detector, . . . , etc.

Any one or more of the communication links 218, 224, could include one or more wireless-communication links and/or one or more wired-communication links.

Finally, computer 214 is part of a computer-aided-dispatch center, manned by an operator providing necessary dispatch operations. For example, computer 214 typically comprises a graphical user interface that provides the dispatch operator necessary information about public-safety officers. As discussed above, much of this information originates from devices 212 providing information to hub 210, which forwards the information to RAN 202 and ultimately to computer 214.

Figure 3:
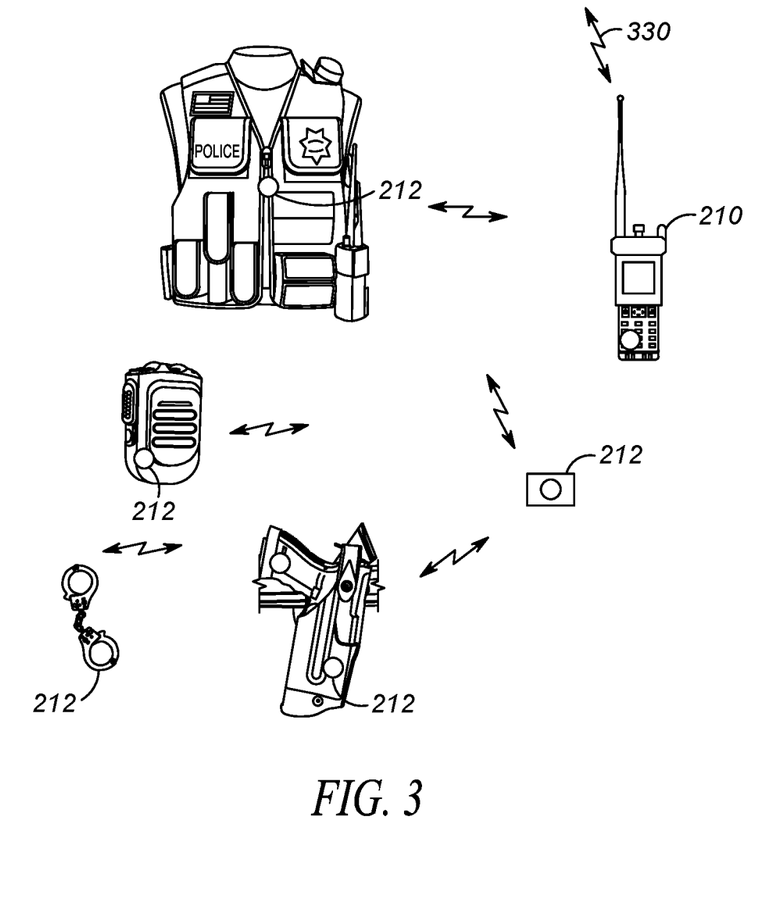
FIG. 3 depicts a more-detailed view of the personal-area network of FIG. 1.

FIG. 3 depicts a more-detailed view of a personal-area network 240 of FIG. 2. Personal-area network comprises a very local-area network that has a range of, for example 10 feet. As shown in FIG. 3, various devices 212 are shown attached to equipment utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, and a camera 212 is provided.

Devices 212 and hub 210 form a PAN 240. PAN 240 preferably comprises a Bluetooth PAN. Devices 212 and hub 210 are considered Bluetooth devices in that they operate using a Bluetooth, a short range wireless communications technology at the 2.4 GHz band, commercially available from the "Bluetooth special interest group". Devices 212 and hub 210 are connected via Bluetooth technology in an ad hoc fashion forming a PAN. Hub 210 serves as a master device while devices 212 serve as slave devices. Devices 212 notify hub 210 of a sensed condition by sending a local status alert transmitted from the sensor as a Bluetooth message. Hub 210 in turn, may forward the local status alert over a wide-area network (e.g., RAN/Core Network) to computer 214. In alternate embodiments of the present invention, hub 210 may forward the local status alert to mobile and non-mobile peers (shift supervisor, peers in the field, etc), or to the public via social media. RAN core network preferably comprises a network that utilizes a public-safety over-the-air protocol.

As discussed above, a problem exists with detained persons escaping from public-safety officers, even after they are handcuffed. In order to address this issue, smart handcuffs are provided herein as part of a personal-area-network (PAN) During operation the smart handcuffs will pair with a first PAN master device (in this case radio 210). An alarm will sound on the handcuffs, or on the master device 210 when:

no PAN system identification (SSID) is detected by the handcuffs;
 no PAN SSID is detected by the handcuffs that matches PAN SSIDs within an internal database;
 when the handcuffs have detected that pairing with a first PAN master device 210 has been broken, and the handcuffs have not paired or are not pairing with a second PAN; or
 when the master device has detected that the handcuffs have broken the pairing with the first PAN master device 210, and no update from the handcuffs has been received by the first master device 210 that the handcuffs have paired or will pair with the second PAN.

Figure 4:
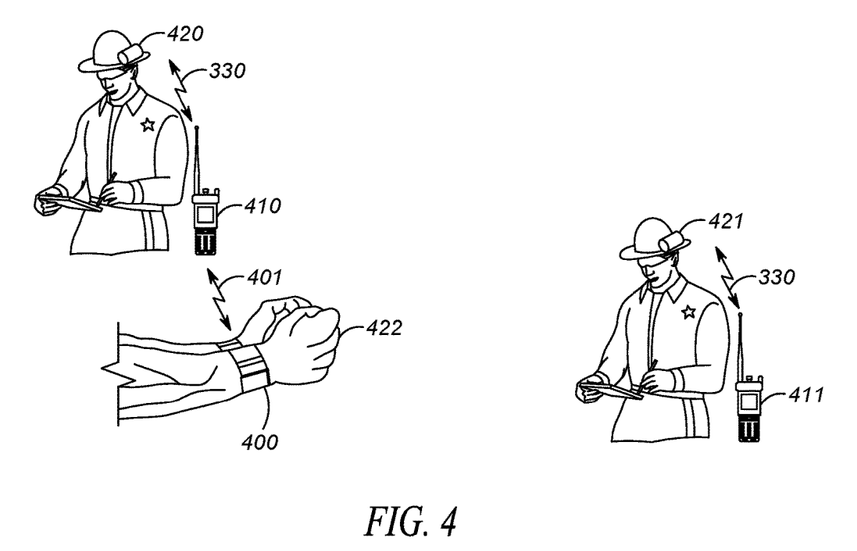
FIG. 4 illustrates smart handcuffs in operation with multiple hubs.

This is illustrated in FIG. 4. As shown in FIG. 4, smart handcuffs 400 secure prisoner 422. Smart handcuffs 400 are paired and in communication with radio 410 associated with officer 420 and a first PAN. Radio 410 serves as a hub for a PAN associated with officer 420. Communications between handcuffs 400 and radio 410 take place via a standard Bluetooth communication link 401.

If the prisoner escapes, the communications link between handcuffs 400 and radio 410 will be broken as the distance between handcuffs 400 and radio 410 increases. When this happens, an alarm on radio 410 and handcuffs 400 may sound. However, because prisoner 422 may be handed over to another officer 421, it will cause a problem if an alarm sounded simply when communications between handcuffs 400 and radio 410 was broken. Therefore, upon the handover of prisoner 422 to officer 421, handcuffs 400 will be instructed by radio 410 to join the PAN associated with officer 421. Handcuffs 400 may comprise an internal database of approved PANs, and will only join approved PANs.

Both radios 410 and 411 will alarm by generating an audible tone when handcuffs 400 has broken the pairing with the radios, and no update from handcuffs 400 has been received by the radios that the handcuffs have paired or will pair with another PAN. When a hub (e.g., radio 410, 411) has detected an alarm condition, a communication signal 330 will be transmitted to dispatch center 214 through core network 204. The communication signal 330 will notify dispatch center 214 of the alarm condition. Dispatch center 214 may notify other officers of the alarm condition.

In addition to the hub/master device alarming, the handcuffs themselves may alarm. As discussed above, handcuffs 400 will comprise an internal database of acceptable hubs to associate with. An alarm will sound on the handcuffs when no PAN system identification (SSID) is detected by the handcuffs, or preferably when no PAN SSID is detected by the handcuffs that matches PAN SSIDs within an internal database. Additionally an alarm will sound on the handcuffs when the handcuffs have broken the pairing with a first PAN master device (e.g., device 410), and the handcuffs have not paired or are not pairing with a second PAN master device (e.g., device 411).

It should be noted that a periodic beacon may be transmitted between the handcuffs and the master device over the PAN. This may be used to determine if/when the PAN connection has been lost between the handcuffs and the master device. Thus, when no periodic beacon is received, it can be assumed that the PAN connection has been broken between the handcuffs and the master device.

Figure 5:
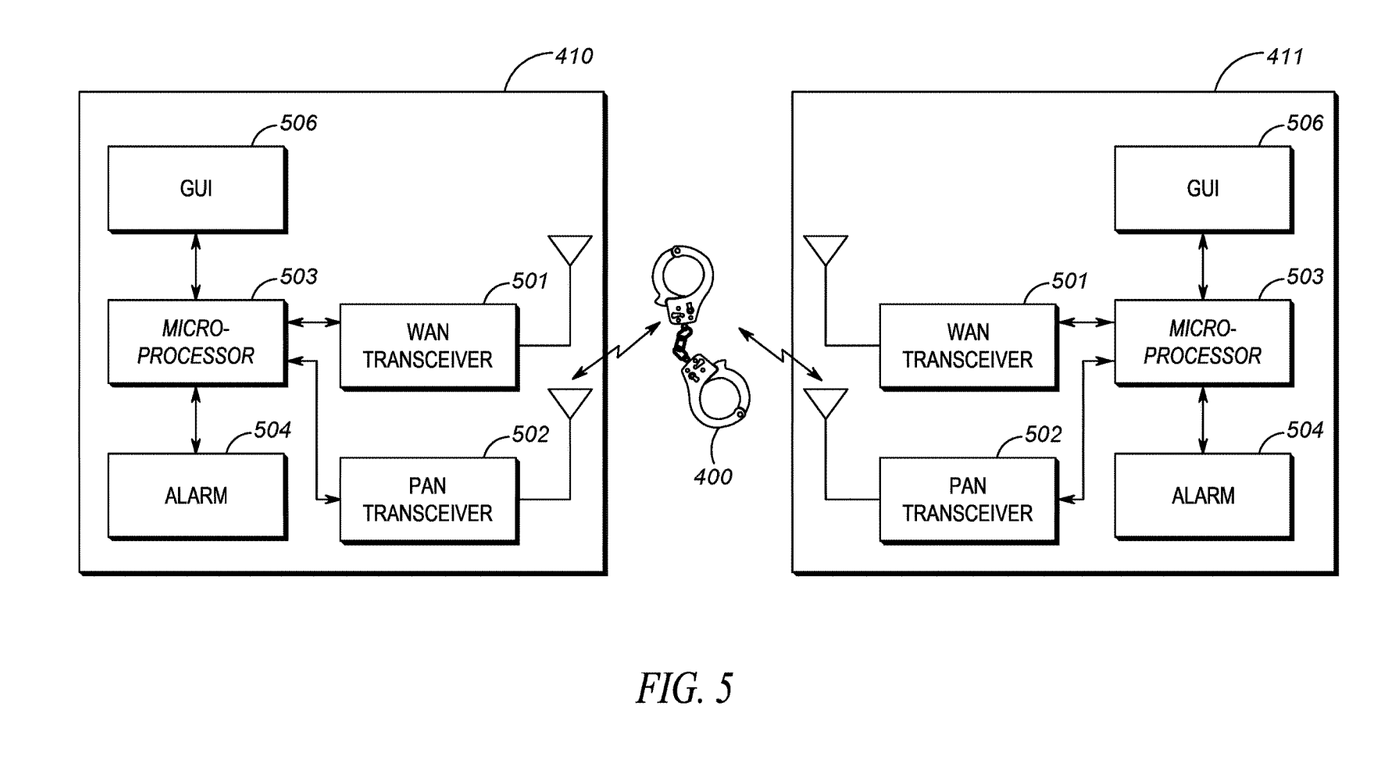
FIG. 5 is a block diagram of a hub or master device.

FIG. 5 is a block diagram of a PAN devices 410 and 411. As shown, devices 410 and 411 may include a wide-area-network (WAN) transceiver 501 (e.g., a transceiver that utilizes a public-safety communication-system protocol), PAN transceiver 502 (e.g., a short-range transceiver), GUI 506, logic circuitry 503, and alarm 504. In other implementations, devices 410 and 411 may include more, fewer, or different components.

WAN transceiver 501 may comprise well known long-range transceivers that utilize any number of network system protocols. (As one of ordinary skill in the art will recognize, a transceiver comprises both a transmitter and a receiver for transmitting and receiving data). For example, WAN transceiver 501 may be configured to utilize a next-generation cellular communications protocol operated by a cellular service provider, or any public-safety protocol such as an APCO 25 network or the FirstNet broadband network.

PAN transceiver 502 may be well known short-range (e.g., 30 feet of range) transceivers that utilize any number of network system protocols. For example, PAN transceiver 502 may be configured to utilize Bluetooth communication system protocol for a body-area network, or a private 802.11 network.

GUI 506 comprises provides a way of displaying information and receiving an input from a user to initiate, for example, a handover from device 410 to device 411. In addition, in an embodiment, GUI 506 provides a way of conveying (e.g., displaying) information received by handcuffs, whether or not handcuffs are detected, and whether or not handcuffs are being handed over to an authorized device. In order to provide the above features (and additional features), GUI 205 may comprise a touch screen to provide a man/machine interface.

Alarm 504 is preferably a speaker that generates an audible tone, however one of ordinary skill in the art will recognize that alarm 504 may comprise any circuitry that provides a warning or indication that a PAN link to handcuffs has been broken.

Logic circuitry 503 comprises a digital signal processor (DSP), general purpose microprocessor, a programmable logic device, or application specific integrated circuit (ASIC) and is configured to detect when the handcuffs have broken the pairing with the first PAN master device 210, and no update from the handcuffs has been received by the first master device 210 that the handcuffs have paired or will pair with the second PAN.

The detection when handcuffs are no longer part of a PAN is accomplished by logic circuitry 503 being coupled to PAN transceiver 502 and detecting when a periodic beacon is no longer received from the handcuffs. Additionally, the detection of whether or not the handcuffs are joining another PAN is accomplished by PAN transceiver 502 receiving information from the handcuffs that handover is taking place, or has taken place.

One of ordinary skill in the art will recognized that the PAN network is formed by logic circuitry 503 instructing PAN transceiver 502 to transmit necessary information for pairing to (or forming) a PAN. In addition logic circuitry 503 will instruct PAN transceiver 502 to listen for necessary PAN-forming messages transmitted by other devices. PAN formation takes place as described in, for example, the Bluetooth standard.

Devices 410 and 411 comprise a master device as part of a personal-area network (PAN) comprising a first transceiver pairing handcuffs with a first PAN, the transceiver 502 configured to receive an update from the handcuffs when the handcuffs pair or will pair with a second PAN. Logic circuitry is provided for determining that the handcuffs have broken the pairing with the first PAN, An alarm sounds when the handcuffs have broken the pairing with the first PAN, and no update from the handcuffs has been received that the handcuffs have paired or will pair with the second PAN.

As discussed above, a second transceiver 501 is provided and configured to notify a dispatch center of the fact that the handcuffs have broken the pairing with the first PAN, and no update from the handcuffs has been received that the handcuffs have paired or will pair with the second PAN. Additionally, the first transceiver comprises a short-range transceiver and the second transceiver comprises a long-range transceiver. More particularly, the first transceiver may comprise a Bluetooth transceiver and the second transceiver may comprise a transceiver utilizing a public-safety over-the-air protocol.

Any updates received from handcuffs 400 to PAN transceiver 502 may comprise a system identification of a second PAN that is detected by handcuffs 400.

Figure 6:
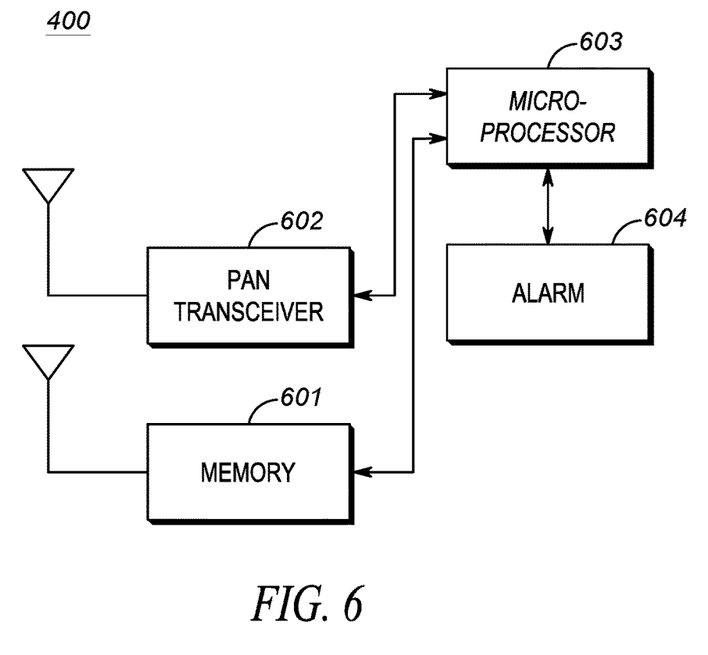
FIG. 6 is a block diagram of smart handcuffs.

FIG. 6 is a block diagram of handcuffs 400. Similar to devices 410 and 411, handcuffs 400 comprise a PAN transceiver 602, logic circuitry 603, and alarm 604. Handcuffs also comprise memory 601 that stores authorized PANs for associating with. During operation, logic circuitry 603 will determine:

when no PAN system identification (SSID) is detected by the handcuffs;
when no PAN SSID is detected by the handcuffs that matches PAN SSIDs within an internal database 602; and/or
when the handcuffs have detected that pairing with a first PAN master device 210 has been broken, and the handcuffs have not paired or are not pairing with a second PAN.

When logic circuitry 603 had detected any of the above situations, logic circuitry 603 will instruct alarm 604 to sound.

When handing off handcuffs 400 between PAN master devices, a first master device will message PAN transceiver 602, instructing handcuffs 400 to associate with a second master device. Handcuffs 400 may perform a network search and provide the first master device with all detected networks. The first master device may then pick a network from the available networks, and instruct handcuffs 400 to associate with the chosen network. PAN device 400 will then confirm the association.

Elaborating on the above, logic circuitry 603 may instruct PAN transceiver 602 to periodically search for PAN networks, and to provide the detected networks to a PAN master device. PAN transceiver may then receive an instruction from its master device to associate with a chosen PAN master device and to drop the connection with the current PAN master device. Microprocessor 603 will then instruct PAN transceiver 602 to transmit an acknowledgment, and to associate with the chosen PAN master device.

As discussed above, microprocessor 603 will instruct PAN transceiver 602 to periodically scan for all PAN master devices within range. Detected master devices will be provided to microprocessor 603, and microprocessor 603 may instruct alarm 604 to sound if none of the detected PAN master devices exist within memory 601. This is illustrated in FIG. 7.

Figure 7:
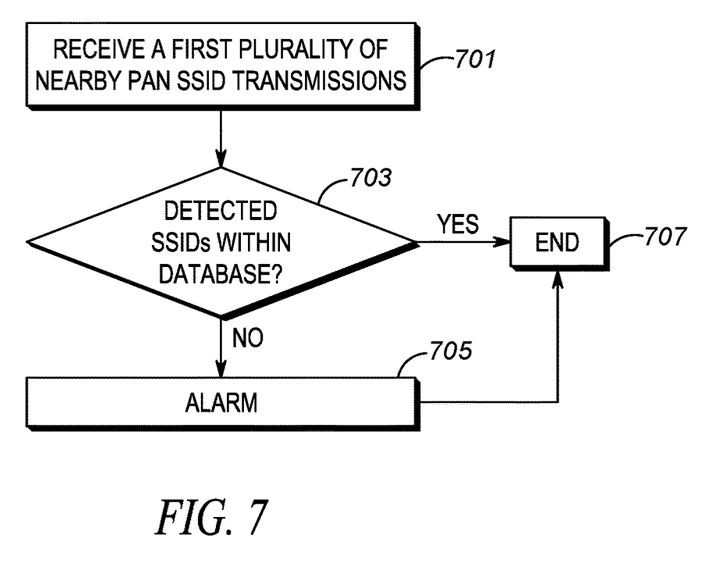
FIG. 7 is a flow chart showing operation of the handcuffs of FIG. 6.

FIG. 7 is a flow chart showing those steps (not all necessary) for handcuffs 400 to take when alarming. The logic flow begins at step 701 where transceiver 602 receives a first plurality of personal-area network (PAN) system identification (SSID) transmissions from a plurality of PANs. As discussed, this step is performed as part of a periodic scanning operation. At step 703, logic circuitry 603 determines if any of the first plurality of PAN SSIDs are within the database, and if not, instructs alarm 604 to sound (step 705) when no SSID is detected by the transceiver or when none of the first plurality of PAN SSIDs are within the database. The logic flow ends at step 707.

The handcuffs in FIG. 7 comprise a transceiver 602 scanning for a first plurality of personal-area network (PAN) system identifications (SSID) from a plurality of PANs, a database 601 comprising a plurality of permissible PAN SSIDs, logic circuitry 603 determining if any of the first plurality of PAN SSIDs are within the database, and an alarm 604 sounding when no SSID is detected by the transceiver or when none of the first plurality of PAN SSIDs are within the database.

As discussed above, transceiver 602 may comprises a Bluetooth transceiver. Additionally, PAN SSIDs comprise unique identifiers for various public-safety PANs.

Figure 8:
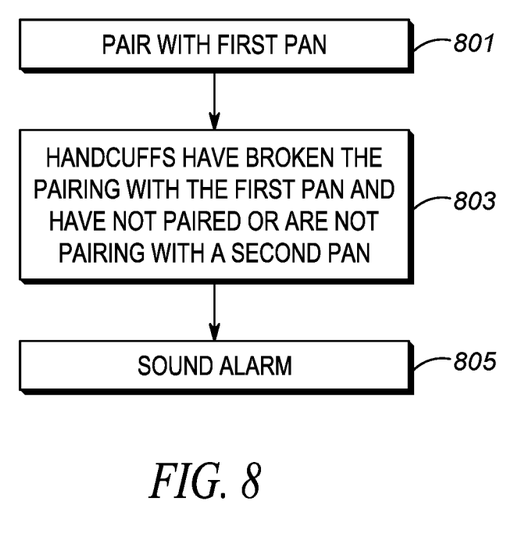
FIG. 8 is a flow chart showing operation of the handcuffs of FIG. 6.

As discussed above, handcuffs 400 may alarm when a PAN connection is broken. The logic flow for this event is shown in FIG. 8. The logic flow begins at step 801 where transceiver 602 is paired with a PAN master device by pairing the handcuffs with a first PAN. As discussed above, transceiver 602 and logic circuitry 603 are configured to send an update from the handcuffs to a PAN master device when the handcuffs pair or will pair with a second PAN. At step 803 logic circuitry 603 determines that the handcuffs have broken the pairing with the first PAN and have not paired or are not pairing with a second PAN. Finally, at step 805 logic circuitry 603 instructs alarm 604 to sound.

The handcuffs described in FIG. 8 comprise a transceiver 602 pairing the handcuffs with a first PAN, the transceiver configured to send an update from the handcuffs to a PAN master device when the handcuffs pair or will pair with a second PAN, logic circuitry 603 determining that the handcuffs have broken the pairing with the first PAN, and an alarm 602 sounding when the handcuffs have broken the pairing with the first PAN, and the handcuffs have not paired or are not pairing with the second PAN.

As discussed, the transceiver 602 is configured to receives instructions from the PAN master device to pair with the second PAN and the transceiver transmits information to the PAN master device on whether or not the handcuffs are pairing or have paired with the second PAN.

Figure 9:
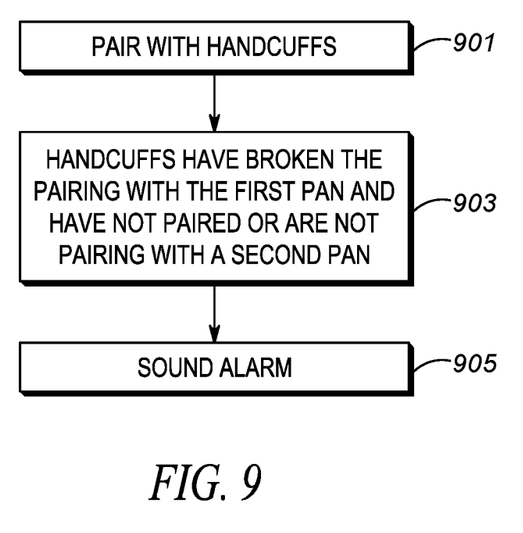
FIG. 9 is a flow chart showing operation of a hub of FIG. 5.

FIG. 9 is a flow chart showing operating of a PAN master device. More particularly, the logic flow of FIG. 9 shows the steps (not all necessary) for a first master device to alarm. The logic flow begins at step 901 where PAN transceiver 502 pairs with handcuffs 400 as part of a first PAN. As discussed above, PAN transceiver 502 is configured to receive an update from handcuffs 400 when the handcuffs pair or will pair with a second PAN.

At step 903 logic circuitry 503 determines that handcuffs 400 have broken the pairing with the first PAN and no update from handcuffs 400 has been received that the handcuffs have paired or will pair with the second PAN. Finally, at step 905 logic circuitry 503 instructs alarm 504 to sound. More particularly, alarm 504 will be instructed to sound when handcuffs 400 have broken the pairing with the first PAN and no update from handcuffs 400 has been received that the handcuffs have paired or will pair with the second PAN.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device for preventing detained persons from escaping public-safety officers, the device comprising:
   handcuffs for securing a detained person;
   a transceiver integrated with the handcuffs and configured to scan for a first plurality of personal-area network (PAN) system identifications from a plurality of PANs;
   a database, stored in a computer-readable memory integrated with the handcuffs, comprising a plurality of permissible PAN system identifications;
   logic circuitry integrated with the handcuffs and configured to determine if any of the first plurality of PAN system identifications are within the plurality of permissible PAN system identifications stored in the database; and
   an alarm integrated with the handcuffs and configured to sound when no system identification is detected by the transceiver or when none of the first plurality of PAN system identifications detected by the transceiver are determined to be within the plurality of permissible PAN system identifications stored in the database.

2. The device of claim 1 wherein the transceiver comprises a Bluetooth transceiver.

3. The device of claim 1 wherein the first plurality of PAN system identifications comprise unique identifiers of various public-safety PANs.

4. The device of claim 1 wherein the system identification comprises a server set system identification (SSID).

5. The device of claim 1, wherein the alarm is configured to sound when no system identification is detected by the transceiver.

6. The device of claim 1, wherein the alarm is configured to sound when none of the first plurality of PAN system identifications detected by the transceiver are within the database.

7. The device of claim 1, wherein the alarm is configured to refrain from sounding when one of the first plurality of PAN system identifications detected by the transceiver are within the plurality of permissible PAN system identifications stored in the database.

8. A system for preventing detained persons from escaping public-safety officers, the system comprising:
   handcuffs for securing a detained person, the handcuffs including:
     a transceiver integrated with the handcuffs and configured to scan for a first plurality of personal-area network (PAN) system identifications from a plurality of PANs;
     a database, stored in a computer-readable memory integrated with the handcuffs, comprising a plurality of permissible PAN system identifications;
     logic circuitry integrated with the handcuffs and configured to determine if any of the first plurality of PAN system identifications are within the plurality of permissible PAN system identifications stored in the database; and
     an alarm integrated with the handcuffs and configured to sound when no system identification is detected by the transceiver or when none of the first plurality of PAN system identifications detected by the transceiver are determined to be within the plurality of permissible PAN system identifications stored in the database;
   a master device member of one of the plurality of PANs having a particular system identifier matching one of the plurality of permissible PAN system identifications stored in the database, the master device further comprising:
     a first transceiver configured to pair with the handcuffs via the particular system identifier;
     logic circuitry configured to determine, via the first transceiver, that the handcuffs have broken the pairing; and
     an alarm configured to sound responsive to the determination that the handcuffs have broken the pairing.

* * * * *